May 15, 1951 G. E. UNDY 2,553,019
CONTROL APPARATUS
Filed June 16, 1942 2 Sheets-Sheet 1

INVENTOR
Gustav E. Undy.
BY
Harness, Dickey & Pierce
ATTORNEYS.

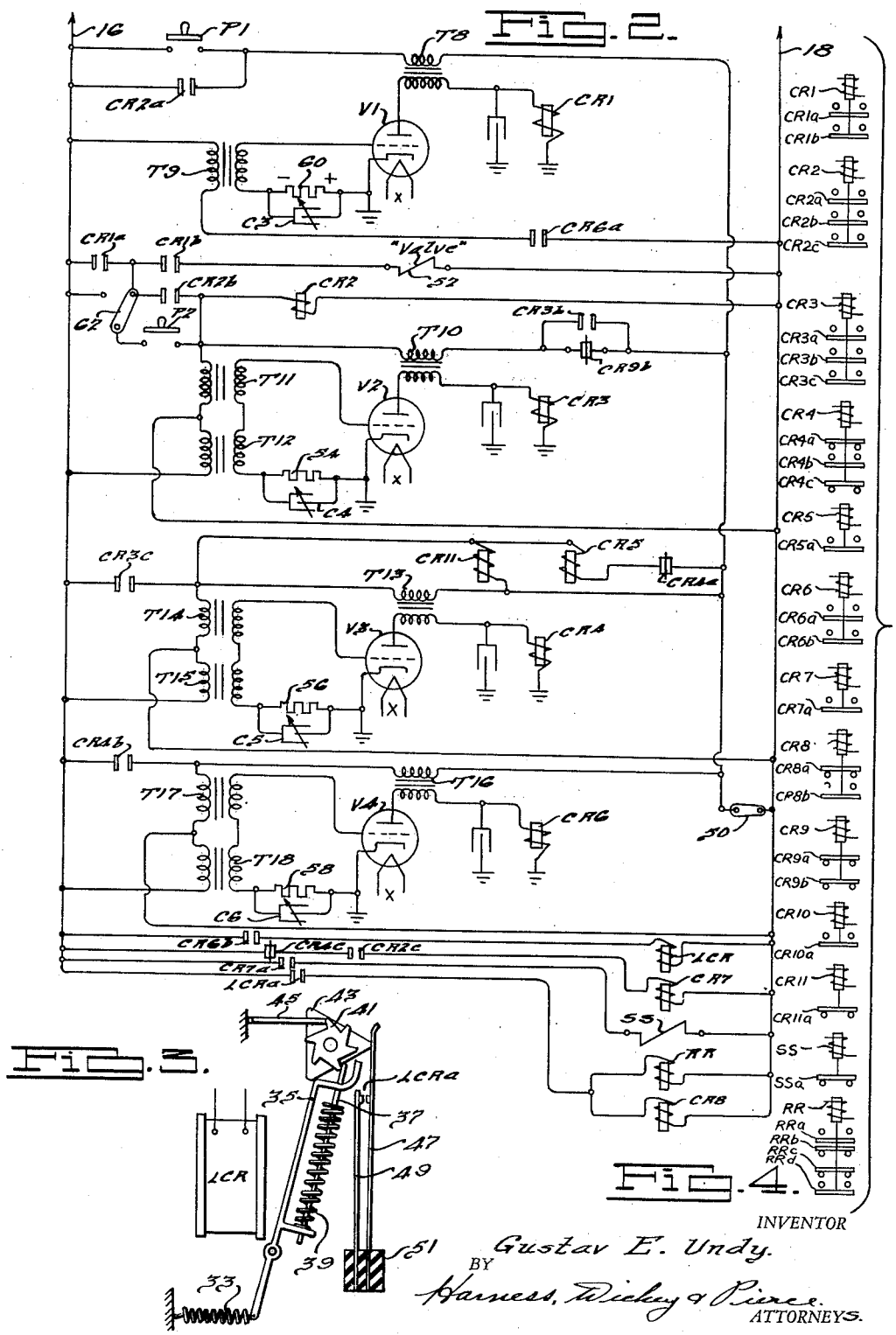

Patented May 15, 1951

2,553,019

UNITED STATES PATENT OFFICE 2,553,019

CONTROL APPARATUS

Gustav E. Undy, Detroit, Mich., assignor, by mesne assignments, to Weltronic Company, Oakland County, Mich., a corporation of Michigan Application June 16, 1942, Serial No. 447,305

7 Claims. (Cl. 320—1)

The present invention relates to electrical control apparatus, and in particular provides an improved resistance welding control system of the condenser discharge type.

The principal objects of the present invention are to provide a system for transferring energy from a source of power to a work circuit, of the type wherein energy is delivered from the source to energy storage apparatus at a relatively low rate and is thereafter delivered at a relatively higher rate from the storage apparatus to the load circuit, which system is simple in arrangement and is economical and efficient in operation; to provide such a system wherein the energy storage apparatus comprises one or more condensers and wherein the energy stored in the condensers is delivered to a resistance welding load circuit through a single phase transformer; to provide such a system wherein successive impulses are passed through the transformer in alternately opposite directions; to provide such a system wherein the reactive energy stored in the load circuit during the course of one welding operation is returned to the current storage apparatus so as to partially recharge the same in readiness for the next operation; to provide such a system wherein the energy storage apparatus is charged to alternately opposite polarities in preparation for successive welding operations and wherein the aforesaid reactive energy associated with one operation serves to partially recharge the storage apparatus to the opposite polarity in preparation for the next operation; to provide such a system wherein the energy storage apparatus is disconnected from the power source prior to the making of each welding operation and is reversely reconnected thereto at the end of such operation; to provide such an arrangement embodying an improved voltage regulating system for insuring that the current storage apparatus is charged to the proper degree before a welding operation is initiated; to provide such an arrangement embodying an improved sequence control system for determining the successive work engaging, current flow and related steps of a complete welding operation; and to generally improve the operation and arrangement of control systems of the above indicated type.

With the above as well as other objects in view, which appear in the following description and in the appended claims, a preferred but illustrative embodiment of the invention is shown in the accompanying drawings, throughout the several views of which corresponding reference characters are used to designate corresponding parts and which drawings, together, disclose said embodiment of the invention. In the drawings:

Fig. 2 is a diagrammatic view of the remaining circuits;

Fig. 3 is a diagrammatic view of a latching type relay; and

Fig. 4 is a view showing the mechanical connection between the various relay coils and the contacts operated thereby.

Figure 1:
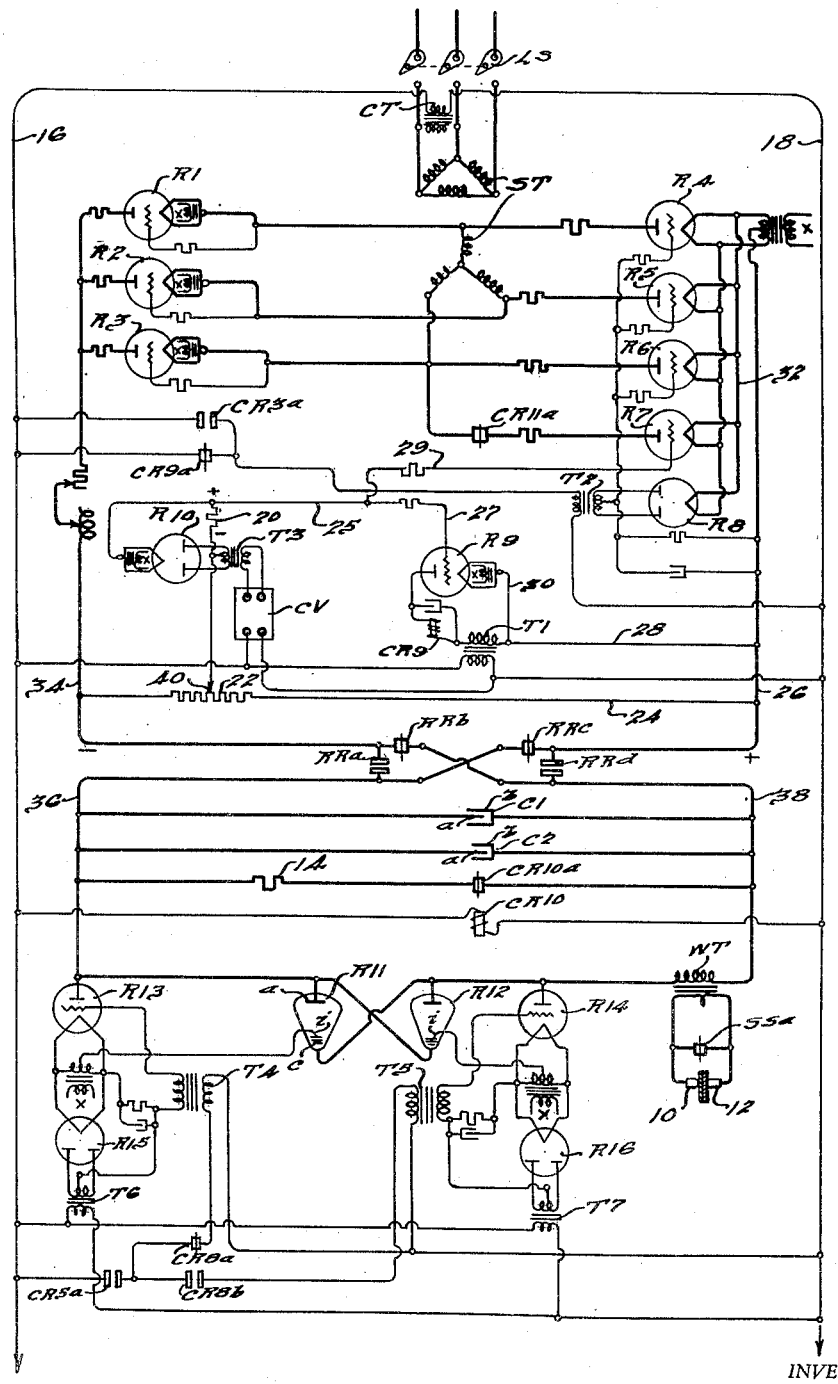
Figure 1 is a diagrammatic view of certain of the circuits embodying the invention.

It will be appreciated from a complete understanding of the invention that certain of the features thereof may be utilized indepenedently of others of the features thereof and that the system as a whole may be utilized for a wide variety of purposes other than the herein specifically described purpose. A preferred use of the invention is in connection with resistance welding apparatus, adapted to the welding of certain of the relatively low resistance metals (aluminum, etc.), which require welding current impulses of relatively high intensity but of relatively short duration.

Referring to the drawings, the illustrative electrodes 10 and 12 are connected directly in the secondary circuit of a usual welding transformer WT. Current flow through the primary winding of the welding transformer is controlled by a pair of reversely connected main rectifiers R11 and R12, which, as shown, are directly interposed in the primary circuit of the transformer. Rectifiers R11 and R12 may be of any suitable type, but are preferably of the mercury pool type, such as those sold under the trade name "Ignitron." Rectifiers of this sort will be understood as being normally non-conductive, but as being capable of being rendered conductive by applying an igniting potential between the igniter electrode $i$ and the cathode $c$ at a time when the anode $a$ is positive relative to the cathode. When so rendered conductive, the rectifiers remain conductive until the current therethrough falls to such a low value as to be incapable of maintaining a discharge through the rectifier, even though, during such current flow, the anode-cathode polarity is reversed.

The main rectifiers R11 and R12 are provided with means comprising electric valves R13 and R14 for selectively rendering the main rectifiers conductive. Valves R13 and R14, which are preferably of the discontinuous type, are normally non-conductive but are adapted to be rendered conductive during the course of successive welding operations, as described below.

The main rectifiers R11 and R12 are directly connected to receive energy from one or more condensers C1 and C2, which condensers are normally maintained in a discharged condition, when the system is inactive, by means of a discharge circuit including resistor 14 and the normally closed contact CR10a of a control relay CR10.

The main condensers C1 and C2 are disposed to be connected, through the contacts RRa through RRd of a reversing switch, to receive power from a supply transformer ST. The primary winding of the supply transformer is shown as connected in delta and is disposed to receive power from a usual three-phase alternating current source. The secondary windings of the supply transformer ST are shown as connected in star, and as connected to the condensers C1 and C2 through a series of rectifiers R1 through R7. Rectifiers R1 and R4 are associated with one leg of the transformer winding, rectifiers R2 and R5 are associated with a second leg, and rectifiers R3, R6 and R7 are associated with the third leg. It is noted that rectifier R7 serves as a trickle charge tube and functions to maintain the main condensers C1 and C2 in a fully charged condition except under conditions when the system is inactive, or during the course of a welding operation. The rectifiers R1, R2 and R3 are continuously conductive, but rectifiers R4, R5 and R6 are subject to control by a blocking transformer T2, the secondary winding whereof is coupled between the grids and cathodes of rectifiers R4 through R6, through an auxiliary rectifier R8. Transformer T2 is under the control of a voltage regulating relay CR9, the energized or de-energized condition whereof is determined by the degree to which the main condensers are charged. More particularly, the voltage regulating valve R9 functions through transformer T2 to interrupt the flow of charging current through the rectifiers R4, R5 and R6, when the charge on the condensers reaches substantially the full desired value. At a slightly higher value of condenser voltage the trickle charge tube is rendered non-conductive.

Rectifiers R1 through R7 and R9 may be and preferably are of the usual gas-filled, discontinuous type, and auxiliary rectifiers R8 and R10, which are associated therewith, may be of any conventional type.

The sequence control system comprises a series of control relays CR1, CR2, CR3, CR4, CR5, CR6, CR7, CR8, CR9, CR10 and CR11, a latching relay LCR, a short circuiting switch SS and the previously mentioned reversing switch RR, which relays and switches serve, as described below, to control the steps of each individual welding operation, as well as to control the conditioning of the system for the next successive welding operation. Certain of the just-mentioned relays are under the control of a series of electric valves, designated V1, V2 and V3, which may be and preferably are of the high vacuum continuous control type. The just-identified relays and switches, with the exception of the relay designated LCR, are of the usual electromagnetically operated type, comprising an operating coil and one or more contacts which bear the same reference characters as the corresponding coil, plus the subscripts a, b, etc. Except as to relay LCR, the several relay and switch contacts occupy the illustrated positions when the corresponding coils are de-energized, but move to and remain in the opposite position so long as the corresponding coils are energized.

Referring to Fig. 3, the relay LCR may be of a usual construction disposed to stably occupy either of two positions so long as its coil is de-energized. If the coil is energized, this relay moves to the opposite position, in which it remains until the coil is de-energized and is thereafter re-energized. The relay LCR is provided with a single contact LCRa, which occupies either the open or the closed position, depending upon which of the two stable positions the relay is in. As shown in the drawings, the relay LCR is in such a position that the contact LCRa is open.

The cooperating elements of the contact LCRa are carried on arms 47 and 49, which are supported in an insulating block 51. Arms 47 and 49 are resilient and tend toward a position in which the contact LCRa is closed. The relay is provided with an armature 35, biased to the position shown by a spring 33, which carries a finger 37. Finger 37 is biased to the position shown by a spring 39, and cooperates with the successive teeth of a ratchet wheel 41, retrograde movement whereof is restrained by a spring pawl 45. The ratchet 41 carries a triangular cam 43 which in the position shown, and in positions displaced 120° therefrom, engages arm 47 and holds the contact LCRa in the open position. In the intermediate three positions, the cam 41 allows the contact to close. As will be obvious, each energization of the coil enables finger 37 to advance the ratchet one step. When the coil is de-energized, spring 39 yields and allows the finger 37 to move downwardly and clear the ratchet during the return movement of the armature 35, as influenced by spring 33.

It is thought that the remaining details of the system, including a description of the specific functions performed by the elements thereof, may best be understood from a description of the operation of the system as a whole.

The system may be conditioned for operation by closing the disconnect switch, designed LS at the top of Fig. 1, which action immediately energizes the supply transformer ST and also immediately energizes the control transformer CT. Upon being energized, the control transformer CT supplies alternating current to the control conductors, designated 16 and 18 in Fig. 1, and correspondingly designated in Fig. 2. In addition, the energization of the control transformer may be and preferably is arranged to supply energizing current to the primary windings of all of the transformers which are designated x in Fig. 1, which transformers, as will be understood, serve to supply filament current for rectifiers R1 through R16, and to also supply filament current to valves V1, V2, and V3 of Fig. 2.

In Fig. 1, the energization of line conductors 16 and 18 completes energizing circuits for the primary windings associated with transformers T1, T3, T6, and T7. If desired, a voltage regulating unit CV may be interposed between the source 16—18 and transformer T3 so as to render the output of transformer T3 uniform and free of fluctuations of the voltage of the source. Transformers T6 and T7, respectively, are coupled to the grids of the firing valves R13 and R14 through rectifiers R15 and R16, and upon being energized, become effective to apply negative biases to these grids, thereby rendering valves R13 and R14 non-conductive.

Transformer T3 is connected, through rectifier

R10, across resistor 20, and, upon being energized, is effective to impress a potential across this resistor having the polarity indicated in the drawing. Resistor 20 is coupled between the grid and cathode of rectifier R9 through the potentiometer resistor 22 and conductors 24, 26, 28, 30, 27 and 25. Under the conditions stated, the main condensers C1—C2 are discharged, and are not effective to impress a potential across resistor 22.

The just-mentioned potential of resistor 20, accordingly, brings the grid of valve R9 to a positive value relative to the cathode of this valve and renders the valve conductive. Similarly, resistor 20 is coupled between the grid and cathode of the trickle charge valve R7 through conductors 24, 26, 32, 29 and 25, and the just-mentioned potential, therefore, serves to render the trickle charge valve conductive.

Upon being energized, transformer T1 applies anode potential to the now conductive rectifier R9, which action energizes control relay CR9 and causes the normally closed back contact CR9a of this relay to open. This action interrupts an otherwise complete energizing circuit for the primary winding of control transformer T2, associated with rectifier R8. As aforesaid, transformer T2 is coupled, through the rectifier R8, between the grids and cathodes of valves R4 through R6 and when energized, serves to apply a negative or blocking bias to the grids of these valves, which renders them non-conductive. The de-energization of transformer T2 removes this blocking bias and brings valves R4 through R6 to a conductive condition.

The energization of line conductors 16 and 18 also completes an obvious energizing circuit in Fig. 1 for the coil of control relay CR10, which thereupon opens its sole contact CR10a and interrupts the previously mentioned normally complete discharge circuit for condensers C1 and C2.

Before describing the charging of the main condensers C1 and C2, which results from the unblocking of rectifiers R4 through R7, attention is invited to the operations which result in Fig. 2 from the energization of line conductors 16 and 18. The energization of these conductors in Fig. 2 completes obvious energizing circuits for the primary windings of transformers T12, T15 and T18, which are associated, respectively, with the grid circuits of control valves V1, V2 and V3. Upon being energized, these transformers apply blocking biases to the grids of the corresponding valves, and also supply charging current to the associated grid condensers C3, C4, C5 and C6, which actions render the corresponding valves non-conductive, in preparation for a welding operation.

The energization of the supply transformer ST, coupled with the unblocking of rectifiers R4 through R7, enables the supply transformer ST to pass current through rectifiers R1 through R7 (rectifiers R1, R2 and R3 being continuously conductive) to the positive bus 26 and the corresponding negative bus 34. Under the conditions stated, contacts RRb and RRc of the reversing relay RR are closed, and contacts RRa and RRd thereof are open. Consequently, bus 26 is connected to bus 36, and bus 34 is connected to bus 38, and the flow of current from the supply transformer ST thus charges condensers C1 and C2 in such a direction that the plates a thereof are positive.

As the condensers charge up, the potential of the point 40 on the potentiometer 22, at which the adjustable tap is set, becomes progressively more negative with respect to the potential of the bus 26. When a predetermined condenser potential is attained, corresponding to substantially a desired fully charged potential thereof, the potential of point 40 is sufficiently negative to overcome the positive bias applied to the grid of rectifier R9 by resistor 20, at which time rectifier R9 is rendered non-conductive. Upon being non-conductive, rectifier R9 de-energizes control relay CR9, which thereupon recloses its contact CR9a in Fig. 1 and also recloses its contact CR9b in Fig. 2. The latter action conditions the sequence circuits, as described below, for a welding operation and the former action re-energizes transformer T2. Upon being so re-energized, transformer T2 applies a blocking bias to the grids of rectifiers R4, R5 and R6, interrupting further charging action through these rectifiers. The charging action, however, continues through the trickle charge valve R7 and rectifiers R1 and R2.

At a slightly higher condenser potential, the potential of the point 40 reaches a sufficiently negative value to block the trickle charge valve R7, it being understood that valves R7 and R9 have slightly different characteristics and, consequently, become blocked at slightly different critical potentials of their grids relative to their cathodes. The blocking of the trickle charge valve entirely interrupts further charging action. If the system remains idle for a sufficiently long period to allow the charge on the main condensers C1 and C2 to leak off to an appreciable degree, the rise in potential of the point 40, relative to the bus 26, unblocks the trickle charge valve R7 and enables the supply transformer to restore the condensers to the fully charged condition.

Referring now to Fig. 2, the illustrated sequence control system is provided with two pilots or starting switches, designated P1 and P2. The pilot switch P1 serves to actuate the mechanism which brings the electrodes into clamping engagement with the work, and the pilot switch P2 serves to initiate the flow of welding current and other steps which are incidental to a welding operation. Pilot switches P1 and P2 may be arranged for either manual or automatic operation, but are illustrated as being manually operable. Assuming it is desired to effect a welding operation, the pilot switch P1 may be closed, which action completes an obvious circuit for the primary winding of transformer T8, which circuit also includes a normally closed clear-out switch 50. Upon being energized, transformer T3 energizes control relay CR1 through the normally conductive valve V1. Upon being energized, control relay CR1 closes its normally open contacts CR1a and CR1b. Closure of these contacts completes a circuit for the solenoid 52, also designated "valve," which solenoid, as will be understood, may be associated with usual fluid pressure operated means, which upon being actuated move the electrodes into clamping engagement with the work. It will be noticed that this action may be accomplished independently of the charged or uncharged condition of the main condensers C1 and C2. If the pilot switch P1 is released, the just-mentioned circuits are interrupted, resulting in the separation of the electrodes from the work.

In making a weld, however, the pilot switch P1 is maintained closed until after the closure of the companion pilot switch P2, which latter pilot switch may be closed either before, simultaneously with, or after the closure of pilot switch P1.

Provided relay CR1 has been energized by closure of pilot switch P1, closure of pilot switch P2 completes an obvious energizing circuit for the coil of relay CR2, and for the primary winding of transformer T11 and, subject to the previous closure of contact CR9b, also completes a circuit for transformer T10.

Upon being energized, relay CR2 closes its contacts CR2a, CR2b and CR2c. Contact CR2a completes a holding circuit in parallel with the pilot switch P1, which may thereupon be released to the open position without effect upon the welding cycle now in progress. Contact CR2b completes a self-holding circuit for relay CR2, enabling pilot switch P2 to also be released to the open position without effect upon the cycle now in progress. Closure of contact CR2c completes a circuit for relay CR7, which thereupon closes its contact CR7a and energizes the short circuiting switch SS. Upon being so energized, the short circuiting switch SS opens its sole contact SSa, removing the short circuit from the secondary winding of the welding transformer WT in Fig. 1.

Upon being energized, transformer T11 opposes the normally energized transformer T12 and enables the energy previously stored in the grid condenser C4, associated with valve V2, to start discharging through the associated resistor 54. At the expiration of a relatively short period determined by the characteristics of this discharge circuit, the grid of valve V2 assumes a value at which this valve is conductive. It will be understood that this delay period is calculated to be long enough to insure that the electrodes are in clamping engagement with the work before the flow of welding current is initiated. From the previous description of Fig. 1, it will be appreciated that contact CR9b reclosed when the main condensers C1 and C2 reached a fully charged condition, so that the previous closure of pilot switch P2 was effective to energize transformer T10, associated with the anode circuit of valve V2. If the closure of the pilot switches had occurred during the charging period of the main condensers, all of the aforesaid actions attributed to the closure of pilot switches P1 and P2 would have occurred with the exception that the energization of transformer T10, which serves to actually initiate the flow of welding current, would have been delayed until after the reclosure of contact CR9b.

Upon being energized, transformer T10 applies anode potential to valve V2 and, assuming valve V2 is conductive, as aforesaid, this action completes an energizing circuit for relay CR3, which thereupon closes its contact CR3a (Fig. 1) and also closes its contacts CR3b and CR3c in Fig. 2. Closure of contacts CR3a completes a maintaining circuit for transformer T2, which maintains this transformer energized until the expiration of the welding cycle now in progress and, consequently, maintains charging rectifiers R4, R5 and R6 in a blocked condition. Closure of contact CR3b completes a circuit in parallel with the now closed contact CR9b, and serves to maintain transformer T10 energized until the expiration of the welding cycle now in progress.

Closure of contact CR3c completes energizing circuits for the coils of relays CR5 and CR11, and for the primary windings of transformers T13 and T14, associated with the anode and grid circuits of valve V3. Upon being energized, relay CR11 opens its sole contact CR11a and disconnects the trickle charge rectifier R7 from the supply transformer, thus preventing flow of current through this rectifier until after the expiration of the welding cycle now in progress. Upon being energized, relay CR5 closes its contact CR5a in Fig. 1 and completes an energizing circuit for the firing transformer T4, associated with firing valve R13. This circuit includes the now closed contact CR8a of the control relay CR8, which is synchronized with the reversing switch RR and serves to determine which of the main rectifiers R11 and R12 is to be fired in accordance with the polarity to which the main condensers C1 and C2 are charged. Upon being energized, transformer T4 applies a potential between the grid and cathode of firing valve R13, which overcomes the negative bias of transformer T6 and renders valve R13 conductive. As will be noted, the anode circuit of firing valve R13 is connected between the anode and the igniter electrode i of rectifier R11, and upon being rendered conductive, consequently, is effective to apply a firing potential between the igniter i and the cathode of rectifier R11 which action renders this main rectifier conductive.

Upon being rendered conductive, rectifier R11 enables condensers C1 and C2 to discharge the energy stored therein through the welding transformer WT, which action causes welding current to flow through the electrodes 10 and 12 and the work. It will be understood that the reactive energy stored in the welding transformer serves to maintain the flow of current through the circuit, including the condensers C1 and C2, the rectifier R11, and the welding transformer WT, in the same direction as the impulse of current delivered from the condensers. This continued flow of current dissipates the energy stored in the welding transformer and also partially recharges the main condensers C1 and C2 to a polarity opposite to the original polarity; that is, to a polarity such that the plates b of condensers C1 and C2 are positive. The thus partially recharged condensers are ineffective to cause a reverse flow of current through the welding transformer, since rectifier R11 will pass current only in the original direction, and since the other rectifier R12 is in a non-conductive condition. The welding current thus flows in a single unidirectional impulse, the form, maximum value and duration of which is, of course, determined by the constants of the circuit, including the welding transformer and power condensers. These latter constants also, of course, determine the proportion of the original charge on the condensers which is returned to them from the welding transformer and the proportion of such energy which is dissipated as heat in the welding circuit.

The reduction in condenser voltage, incident to the discharge action, raises the potential of the potentiometer point 48 relative to the potential of the bus 26, and enables the potential impressed across resistor 20 to bring the grids of rectifiers R7 and R9 to values at which these valves are conductive. The bringing of rectifier R7 to a conductive condition, however, is without effect since contact CR11a of control relay CR11 is in the open condition, and it is here noted that this contact remains open until towards the close of the re-setting operations which follow the flow of the welding current. The bringing of rectifier R9 to a conductive condition enables transformer T1 to re-energize control relay CR9, which thereupon re-opens its contact CR9a. This action does not interrupt the energizing circuit for transformer T2, however, since the parallel relay contact CR3a is in the closed condition. Contacts CR11a and CR3a thus serve to maintain the charging circuits in a blocked condition until after the flow of the welding current has ceased and the system is in readiness for the recharging operation.

The re-energization of relay CR9 also causes its contact CR9b (Fig. 2) to re-open. This action is, however, without effect since the now closed contact CR3b of control relay CR3 is connected in parallel therewith and serves to maintain the circuit for transformer T10.

Reverting to the sequence diagram, the energization of transformers T13 and T14, which occurred simultaneously with the initiation of the condenser discharge, conditions relay CR4 for operation. More particularly, transformer T14 opposes the continuously energized transformer T15 and enables the energy stored in condenser C5 to discharge through the associated resistor 56. At the expiration of a period determined by the characteristics of this discharge circuit, the grid of valve V3 assumes a value at which this valve is conductive. It will be understood that this period, which is adjustable, is proportioned to be slightly in excess of the time required for the full discharge and the partial recharge of the main condensers. At the expiration of this timing period, transformer T13 is enabled to pass current through the now conductive valve V3 and energize control relay CR4.

Upon being energized, relay CR4 closes contact CR4b and opens contacts CR4a and CR4c. The opening of contact CR4a interrupts the previously traced energizing circuit for the coil of relay CR5, which thereupon resumes the de-energized position. This action opens contact CR5a and interrupts the circuit for the firing transformer T4 (Fig. 1), enabling transformer T6 to again apply a blocking bias to the grid of valve R13. It will be understood that rectifier R11 became non-conductive at the expiration of the flow of recharging current to the main condensers, so that rectifier R11 and its associated firing valve R13 are now restored to their original non-conductive conditions.

The opening of contact CR4c interrupts the previously traced energizing circuit for the coil of relay CR7, which thereupon resumes the de-energized position, and opens its contact CR7a. The opening of this contact interrupts the circuit for the short circuiting switch, which thereupon recloses its contact SSa in parallel with the secondary winding of the welding transformer. This action insures the fully de-energizing condition of the welding transformer, preparatory to the separation of the electrodes 10 and 12.

The closure of contact CR4b completes an energizing circuit for transformers T16 and T17 associated with the anode and grid circuits of valve V4. Upon being energized, transformer T17 opposes the continuously energized transformer T18 and enables the energy stored in condenser C6 to discharge through the associated resistor 58. At the expiration of a timing period determined by the characteristics of this discharge circuit, valve V4 is rendered conductive and enables the now energized transformer T16 to energize control relay CR6. It will be understood that this timing period, usually called a hold-time period, is proportioned to enable the weld to set after the flow of welding current has ceased and before the electrodes 10 and 12 are separated.

Upon being energized, at the expiration of this hold-time period, relay CR6 serves to reset the sequence circuits in preparation for the next welding operation, and also conditions the power circuits to effect the completion of the recharging of the power condensers. More particularly, relay CR6 closes its contact CR6b and completes a circuit for the coil of the latching relay LCR. This action throws relay LCR to its opposite position, in which its contact LCRa is closed, and it will be recalled that this relay remains in this opposite position, after being so moved, until its coil is de-energized and is again energized. This re-energization of the coil of the relay LCR does not take place until the corresponding stage of the next successive welding operation is reached.

Closure of contact LCRa completes parallel energizing circuits for the windings of the reversing switch RR and the control relay CR8, which windings, consequently, remain energized until the above-mentioned stage of the next welding operation. With its coil RR energized, the reversing switch moves its contacts RRa and RRd to the closed position and opens its contacts RRb and RRc. As is obvious from Fig. 1, this action disconnects buses 26 and 34 from buses 36 and 38, respectively, and connects them to buses 38 and 36, respectively, thereby conditioning the power condensers C1 and C2 to receive charging current from the supply transformer in such a direction as to bring the condenser plates b to the positive polarity. Upon being energized, control relay CR8 opens its contact CR8a in Fig. 1 and closes its contact CR8b. This action prevents the closure of control relay contact CR5a (during the next welding operation) from energizing firing transformer T4, but enables such action to energize firing transformer T5 associated with the other main rectifier R12.

Upon being energized, relay CR6 also closes its contact CR6a and energizes grid transformer T9 associated with valve V1. Upon being energized, transformer T9 applies a blocking bias to the grid of valve V1, thereby preventing further flow of current through this valve, and also charges up the off-time condenser C3, which functions, as hereinafter described, to prevent the re-initiation of a subsequent welding operation until after the expiration of a predetermined off period during which the work may be appropriately moved relative to the electrodes in preparation for such next welding operation.

When valve V1 is blocked, control relay CR1 resumes the de-energized position, opening its contacts CR1a and CR1b. This action de-energizes the valve solenoid 52, enabling the separation of the electrodes from the work, and also de-energizes relay CR2. Upon being de-energized, relay CR2 interrupts the circuit for transformers T10 and T11, which action restores the circuits associated with valve V2 to their original condition and also results in the de-energization of relay CR3.

Upon being de-energized, relay CR3 re-opens its contacts CR3a, CR3b and CR3c. The re-opening of contact CR3a interrupts the circuit for transformer T2, since, as aforesaid, contact CR9a is now open. The consequent de-energization of transformer T2 removes the blocking bias from the grids of the charging rectifiers R4, R5 and R6, and enables the supply transformer ST to initiate a recharging of the condensers C1 and C2 through rectifiers R1 through R6, the recharging action in this case being in a direction to bring the plates *b* of condensers C1 and C2 to the positive polarity.

The re-opening of contact CR3*b* is without immediate effect, since the circuit for transformer T10 is now interrupted at contacts CR1*a* and CR2*b*. This re-opening, however, does render the circuit for transformer T10 subject to the condenser-voltage-responsive relay contact CR9*b*, thus preventing the re-initiation of a new welding cycle unless and until the power condensers reach a fully charged condition.

The re-opening of contact CR3*c* interrupts the circuits for control relay CR11 and for transformers T13 and T14. The de-energization of control relay CR11 causes its sole contact CR11*a* to reclose in Fig. 1, which action reconnects the trickle charge rectifier R7 to the supply transformer ST and again renders this rectifier effective to cooperate in maintaining the condensers C1 and C2 in a fully charged condition.

The de-energization of transformers T13 and T14 restores the circuits associated with valve V3 to their original condition, and also de-energizes control relay CR4, which thereupon opens its contact CR4*b* and recloses its contacts CR4*a* and CR4*c*. The reclosure of contacts CR4*a* and CR4*c* is without immediate effect (since the associated circuits are elsewhere interrupted), but prepares the system for the next operation. The re-opening of contact CR4*b* interrupts the circuits for transformers T16 and T17, which restores the circuits associated with valve V4 to their original condition and de-energizes control relay CR6. This latter action causes contacts CR6*a* and CR6*b* to open. The latter action serves to de-energize the coil of the latching relay LCR, which action is without immediate effect, since, as aforesaid, this relay is stable in either of its two limit positions. The former action interrupts the energizing circuit for transformer T9 and enables the energy stored in grid condenser C3 to start discharging through the associated resistor 60. At the expiration of a predetermined off-time, determined by the characteristics of this discharge circuit, the grid of valve V1 assumes a value at which this valve is conductive, and if at the end of this period pilot switch P1 is still closed, or is reclosed, a new welding cycle may be initiated, as aforesaid.

The foregoing resetting operations restore the sequence and power circuits of Figs. 1 and 2 to their original condition, with the exception that relay LCR is now in its opposite position and that, consequently, the reversing switch RR and the control relay CR8 are in their energized conditions. As aforesaid, these differences serve to reverse the connections between the buses 26 and 34 and buses 36 and 38, and to provide that the next welding operation will result in the firing of rectifier R12, instead of rectifier R11. The completion of the recharging of the power condensers C1 and C2, which was re-initiated when the charging rectifiers R4, R5 and R6 were rendered conductive, serves, as before, to bring the condensers to a fully charged condition, at which time these rectifiers are again blocked in the previously described manner, leaving the trickle charge rectifier R7 effective to maintain the condensers in the fully charged condition.

If a new welding cycle is initiated at the expiration of the above-mentioned off-time, as determined by the off-time condenser C3, the entire sequence is as described above with the exception that in this case the energization of control relay CR5 energizes transformer T5, which thereupon fires rectifier R14 and causes the firing of rectifier R12, instead of energizing transformer T4 and causing the firing of rectifiers R13 and R11. In this case, the consequent firing of rectifier R12 enables condensers C1 and C2 to discharge through the welding transformer WT, the current flow being in a direction opposite to that described in the first instance. In this case, also, the partial recharging of the condensers C1 and C2 takes place through rectifier R12 and again brings the condensers to a charged condition in which the plates *a* thereof are positive. During the resetting operations which follow the welding cycle now being described, also, the closure of relay contact CR6*b* energizes relay LCR, which thereupon moves to its opposite position and re-opens its contact LCR*a*. This action de-energizes the reversing switch RR and the control relay CR8, restoring the contacts of these members to the positions shown in Fig. 1. These actions, as will be understood, connect the condensers to the power source for recharging in the original direction and also condition the circuits associated with rectifiers R11 and R12 to effect the next firing action through rectifier R11.

It will be observed that so long as the pilot switches P1 and P2 are maintained in the closed position, the system will go through successive welding cycles and intervening off-times, as described above, and that, further, the pilot switches P1 and P2 may be opened during the course of any such welding period without affecting the same and without altering the off-time, which must intervene between successive welding cycles. In certain cases, it is desirable to enable the operator to delay or postpone certain of the resetting operations which normally follow the cessation of the flow of welding current. In the present system, this may be accomplished by moving the manually controlled throw-over switch 62 from the illustrated righthand position to the illustrated lefthand position. If this is done, the operator, by maintaining the pilot switch P2 in the closed position, can free the circuit for relay CR2 from control by relay CR1. With switch 62 in the lefthand position, the operations involved in initiating and causing a flow of welding current to the welding circuit are as previously described. When relay CR6 is energized at the close of the hold-time period which follows the welding period, it closes contact CR6*a* and blocks valve V1, as before. As before, also, relay CR1 thereupon resumes the de-energized condition and de-energizes the valve solenoid 52. This action, as before, results in the separation of the electrodes 10 and 12 and the release of the work. If the pilot switch P2 has been released to the open position, the de-energization of relay CR1 also causes all of the other resetting operations, which are described above, and which are initiated by the consequent de-energization of relay CR2. If, on the other hand, in the sequence now being described, pilot switch P2 is maintained in the closed position, the de-energization of relay CR1 is ineffective to de-energize relay CR2 and, consequently, the only resetting operation which follows the flow of welding current is the separation of the electrodes and the release of the work. So long as the operator maintains the pilot switch P2 in the closed position, the other resetting operations, including the recharging of the condensers C1 and C2, are held in abeyance. As soon, however, as the operator re-opens pilot switch P2, these resetting and recharging operations go forward as before.

It will be noticed that certain of the circuits in Fig. 2 extend through the clear-out switch 50. This switch normally occupies the closed position. By moving this switch to the open position, however, a convenient means is afforded for preventing actuation of the sequence control circuits, even though pilot switches P1 and P2 are closed, thus enabling the operator to perform necessary inspection, maintenance, or other operations upon the machine without making it necessary to open the main disconnect switch LS, which action would, of course, also involve discharging the condensers.

Although only a single specific embodiment of the invention has been described in detail, it will be appreciated that various modifications in the form, number and arrangement of parts may be made without departing from the invention.

What is claimed is:

1. In a system for supplying pulses of current from a source of alternating current to a reactive load circuit, the combination of energy storage means, means including selectively controllable means and rectifying means interposed between said source and said storage means for delivering charging current to said storage means in either of two directions so as to charge said storage means to either of two polarities, control means including asymmetric conducting means interposed between said storage means and said load circuit and normally effective to prevent flow therebetween of a said pulse, means operable to render said charging means ineffective to deliver charging current to said storage means and to render said control means effective to pass a said pulse of current between said storage means and said load circuit during which the storage means supplies energy to the load circuit and the load circuit returns energy to and recharges the storage means to a polarity opposite to the original polarity thereof, means controlling said charging means for increasing the charge on said storage means in said opposite polarity, and means for controlling the operation of said operable means in accordance with the charged condition of said storage means.

2. In a system for supplying pulses of current from a source of alternating current to a reactive load circuit, the combination of energy storage means, means including selectively controllable means and rectifying means interposed between said source and said storage means for delivering charging current to said storage means in either of two directions so as to charge said storage means to either of two polarities, control means including asymmetric conducting means interposed between said storage means and said load circuit and normally effective to prevent flow therebetween of a said pulse, means operable to render said charging means ineffective to deliver charging current to said storage means and to render said control means effective to pass a said pulse of current between said storage means and said load circuit during which the storage means supplies energy to the load circuit and the load circuit returns energy to and recharges the storage means to a polarity opposite to the original polarity thereof, and timing means rendered effective by actuation of said operable means for again rendering said charging means effective to deliver charging current to said storage means in said opposite polarity.

3. In a system for supplying pulses of current from a source of alternating current to a reactive load circuit, the combination of energy storage means, means including selectively controllable means and rectifying means interposed between said source and said storage means for delivering charging current to said storage means in either of two directions so as to charge said storage means to either of two polarities, said charging means being normally effective, so long as the potential of said storage means is below a predetermined value, to effect such delivery of charging current, control means including asymmetric conducting means interposed between said storage means and said load circuit and normally effective to prevent flow therebetween of a said pulse, means operable solely subsequent to the attainment of said predetermined potential value by said storage means to render said charging means ineffective to deliver charging current to said storage means and to render said control means effective to pass a said pulse of current between said storage means and said load circuit during which the storage means supplies energy to the load circuit and the load circuit returns energy to and recharges the storage means to a polarity opposite to the original polarity thereof, and means controlling said charging means to supply additional charge to said storage means in said opposite polarity.

4. In a system for supplying power to a reactive load circuit, the combination of an energy storage device chargeable to either of two opposite polarities, means coupling said device to said circuit so as to enable the device when charged to either of said polarities to supply energy to the circuit and to enable reactive energy stored in the circuit to be returned to and partially recharge the device to the opposite polarity, control means rendered effective as a consequence of said storage device attaining a predetermined charge for actuating said coupling means to effect a said supply and return of energy, and additional means rendered effective as a consequence of an actuation of said control means for coupling said device to a source of power so as to complete the recharging thereof to said opposite polarity.

5. In a system for supplying power to a reactive load circuit, the combination of an energy storage device chargeable to either of two opposite polarities, means coupling said device to a source of power for enabling delivery of charging current thereto in either of two directions, means coupling said device to said load circuit so as to enable the device when charged to either of said polarities to supply energy to the circuit and enable reactive energy stored in the circuit to be returned to and partially recharge the device to the opposite polarity, control means for actuating said last-mentioned coupling means to effect a said supply and return of energy and for preventing delivery of charging current to said device from said source during said flow of energy, and means effective as a consequence of the operation of said control means and solely subsequent to said device having received a predetermined charge for rendering said first-mentioned coupling means effective to complete the recharging of said device to said opposite polarity.

6. In a system for supplying power from a source of periodic current to a reactive load circuit, the combination of an energy storage device chargeable to either of two opposite polarities, means coupling said device to said source so as to enable said source during the course of a plurality of periods thereof to charge said device to either of said polarities, means coupling said device to said load circuit and controlled by the charge of said storage device to enable the device when charged to one polarity to supply energy to the circuit solely in a one direction whereby the reactive energy stored in the circuit is returned to and partially recharges the device to the opposite polarity, and means effective to control said first-mentioned coupling means so as to complete the charging of said device to said opposite polarity.

7. In a condenser system, a condenser, means for charging said condenser, a circuit for discharging said condenser, means responsive to the charge on said condenser for preventing establishment of said circuit when the charge on said condenser is below a selected level, and a single means for simultaneously and correspondingly adjusting the condenser charging means and said preventing means to select the voltage above which said circuit may be established.

GUSTAV E. UNDY.

REFERENCES CITED

The following references are of record in the file of this patent:

UNITED STATES PATENTS

| Number | Name | Date |
|---|---|---|
| 1,168,346 | Thomson | Jan. 18, 1916 |
| 1,781,792 | Rodman | Nov. 18, 1930 |
| 1,980,899 | Bedford | Nov. 13, 1934 |
| 2,106,831 | Dawson | Feb. 1, 1938 |
| 2,179,105 | Sidney | Nov. 7, 1939 |
| 2,250,102 | Klemperer | July 22, 1941 |
| 2,287,540 | Vang | June 23, 1942 |
| 2,295,293 | Rogers | Sept. 8, 1942 |
| 2,502,887 | Rava | Apr. 4, 1950 |

FOREIGN PATENTS

| Number | Country | Date |
|---|---|---|
| 548,618 | Great Britain | Oct. 16, 1942 |